455/6

233

Jan. 12, 1971 H. YASTROW 3,555,429

712,331

MASTER ANTENNA DISTRIBUTION SYSTEM

Filed March 11, 1968 7 Sheets-Sheet 1

INVENTOR.
HENRY YASTROV

BY

Hopgood & Calimafde
ATTORNEYS

INVENTOR.
HENRY YASTROV
BY
Hopgood & Calimafde
ATTORNEYS

Jan. 12, 1971 H. YASTROW 3,555,429

MASTER ANTENNA DISTRIBUTION SYSTEM

Filed March 11, 1968 7 Sheets-Sheet 3

INVENTOR.
HENRY YASTROW
BY
Hopgood & Calimafde
ATTORNEYS

INVENTOR.
HENRY YASTROV

BY
Hopgood & Calimafde
ATTORNEYS

Jan. 12, 1971 H. YASTROW 3,555,429

MASTER ANTENNA DISTRIBUTION SYSTEM

Filed March 11, 1968 7 Sheets-Sheet 5

INVENTOR.
HENRY YASTROV

BY

Hopgood & Calimafde
ATTORNEYS

MASTER ANTENNA DISTRIBUTION SYSTEM

Filed March 11, 1968 7 Sheets-Sheet 6

INVENTOR.
HENRY YASTROV

BY Hopgood & Calimafde

ATTORNEYS

Jan. 12, 1971 H. YASTROW 3,555,429

MASTER ANTENNA DISTRIBUTION SYSTEM

Filed March 11, 1968 7 Sheets-Sheet 7

INVENTOR.
HENRY YASTROV

BY Hopgood & Calimafde
ATTORNEYS

United States Patent Office 3,555,429

Patented Jan. 12, 1971

3,555,429

MASTER ANTENNA DISTRIBUTION SYSTEM

Henry Yastrov, Langhorne, Pa., assignor to Jerrold Electronics Corporation

Filed Mar. 11, 1968, Ser. No. 712,231
Int. Cl. H04b 1/18
U.S. Cl. 325—365 13 Claims

ABSTRACT OF THE DISCLOSURE

A multi-channel antenna signal distribution system is provided including an amplifier for each channel and filter means connected to each amplifier and tuned to the channel with which it is associated. Each amplifier is made as a plug-in modular unit so it can be quickly and easily replaced in the distributor housing. The channel selector filters are not included in the modular amplifier unit but instead are located on the distributor housing, so that each amplifier unit can be made the equivalent of each other unit and thus interchangeable with a single spare unit kept on hand to be quickly substituted in the event of amplifier failure in any channel.

BACKGROUND OF THE INVENTION

The present type of television master antenna distribution systems for large institutions such as hotels, apartment buildings, schools, and the like, employ an amplifier unit for each channel. Each amplifier unit includes an amplifier circuit and also a suitable tuning circuit or filter by means of which the particular amplifier is tuned, to provide an amplified television input signal for one particular channel. Furthermore, due to electrical considerations, one amplifier can only be tuned to one of two channels, such as for example, either to channel 2 or 3, or to channel 7 or 8, etc. As a consequence, each amplifier unit in prior art distribution systems can only be used for the given channel to which it is tuned, or upon returning, for its adjacent channel. Accordingly, when any amplifier in the distribution system fails, service on that channel is interrupted until a substitute unit, manufactured and tuned to the particular channel can be obtained. This causes considerable inconvenience both to the many listeners served by the system and also to the management of the facility responsible for operation of the system. Some facilities avoid the inconvenience to their listeners by keeping on hand an entire spare set of amplifiers, one tuned to each different channel served by the system. The cost of such a precaution is rather high, since a separate amplifier is purchased and maintained in reserve for each channel. Furthermore, such expenditure represents a form of economic "loss" to the owner, since it is spent for equipment not ordinarily used, and which may never be used if there is no failure of the original equipment.

OBJECTS OF THE INVENTION

It is one object of this invention to reduce the downtime of a signal distribution system which supplies signals of different frequencies to a group of signal users.

Another object of this invention is to reduce the cost of insuring continuous signal distribution service by reducing the number of spare channel amplifier units required to be kept in reserve for use in the event of amplifier failure.

Still another object is to significantly simplify the problem of maintenance of a multi-channel signal distribution system and also to provide such maintenance at a lower cost.

Yet another object is to make it possible to quickly restore service in a multi-channel signal distribution system by having on hand only a single amplifier which can be substituted for any channel amplifier in the event of failure thereof.

All of the objects, features and advantages of this invention and the manner of attaining them will become more apparent and the invention itself will be best understood by reference to the following description of the invention taken in conjunction with the accompanying drawing.

SUMMARY OF THE INVENTION

Briefly, in accordance with this invention, there is provided a multi-channel antenna signal distribution system which includes a modular amplifier for each channel and filter means including discrete frequency selective networks each for passing a signal channel of predetermined bandwidth, said filter means being provided physically apart from the modular amplifiers. The modular amplifier units are made to be slidably engaged in a housing so they can be quickly removed and replaced. By arranging all of the frequency determining elements external to the modular amplifier units, the units are all interchangeable with a single spare unit. With this feature and the quick-change feature, any amplifier unit can be replaced very quickly by the single spare unit kept in reserve to be substituted in the event of failure of any one amplifier.

DESCRIPTION OF PREFERRED EMBODIMENTS

Figures 1, 2, 5:
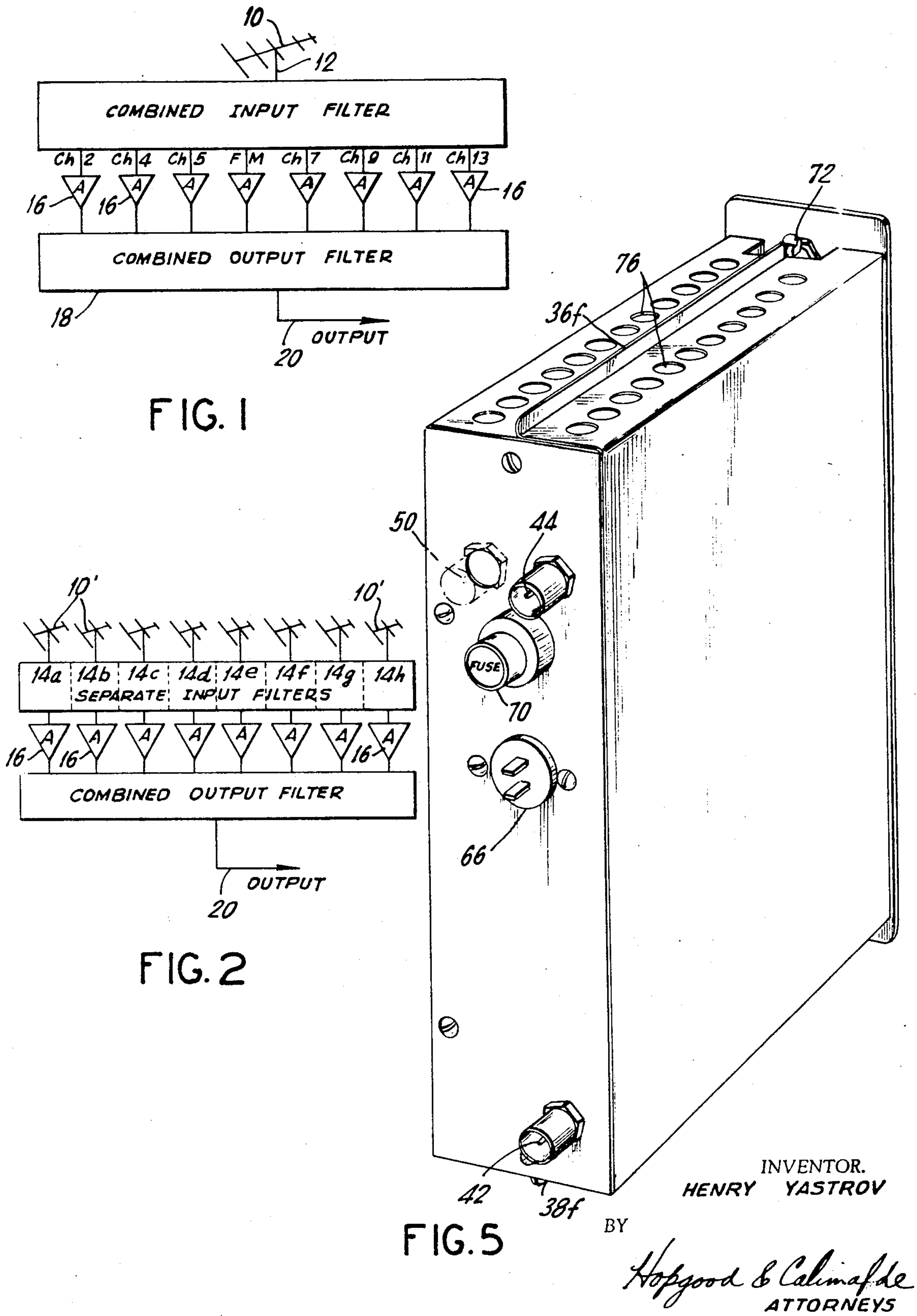
FIG. 1 is a schematic diagram showing one arrangement of the signal distribution system of this invention.
FIG. 2 shows another arrangement of the signal distribution system of this invention.
FIG. 5 is an oblique view from the rear of one type of modular amplifier used in the enclosure.

Referring now to FIG. 1, there is shown one embodiment of the multi-signal distribution system of this invention. This embodiment employs a single television antenna 10 for picking up a plurality of signals in the television frequency band and feeding the same over a lead in 12 to a combined input filter 14. This input filter 14 includes eight frequency selective networks, as will appear later, for selecting certain television channels and FM frequencies. These may be, for example channels 2, 4, 5, FM frequencies, and channels 7, 9, 11 and 13, as indicated in FIG. 1. Each selected channel signal is then fed to its own amplifier 16, after which the signals are then fed to a combined output filter 18, the latter also having frequency selective networks tuned to the same channels as the input filter 14. The output line 20 from the output filter 18 is then routed to various user locations, such as for example, tenants in apartment buildings, hotel rooms and the like.

In accordance with the principles of this invention, each of the amplifiers 16 is made alike, either as a manual type or as an AGC (automatic gain control) type, and each is provided as a separate modular amplifier unit, independent and physically separate from the filters 14 and 18 which form an integral part of the signal distribution system.

FIG. 2 shows a second embodiment of the invention which employs a different antenna 10' for each channel instead of the single antenna 10 of FIG. 1. This embodiment is particularly useful for applications which require the reception of signals from different directions and where it is desired to receive signals from distant stations. The signal from each different antenna 10' is fed to one of the separate input filters **14*a*–14*h* which have frequency selective networks similar to those provided in the combined input filter 14** of FIG. 1. The remaining elements of the system of FIG. 2 are the same as in FIG. 1, as indicated by the same numerals.

Figure 3:
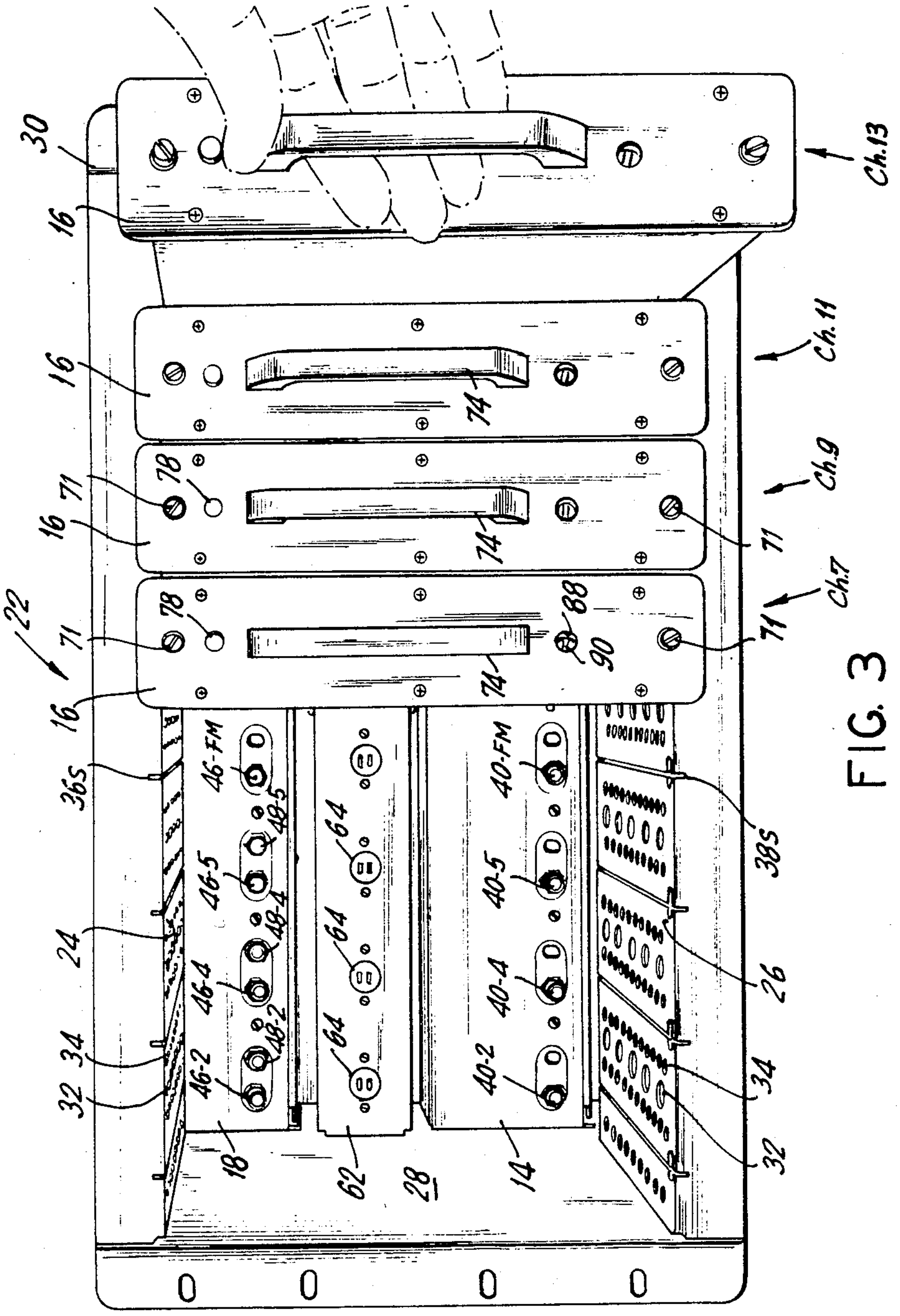
FIG. 3 is a front view of an enclosure for accommodating portions of the system seen in FIGS. 1 and 2, including modular amplifiers, four of which have been removed from the enclosure, three of which are fully engaged and one of which is in the partly removed position.
Figure 4:
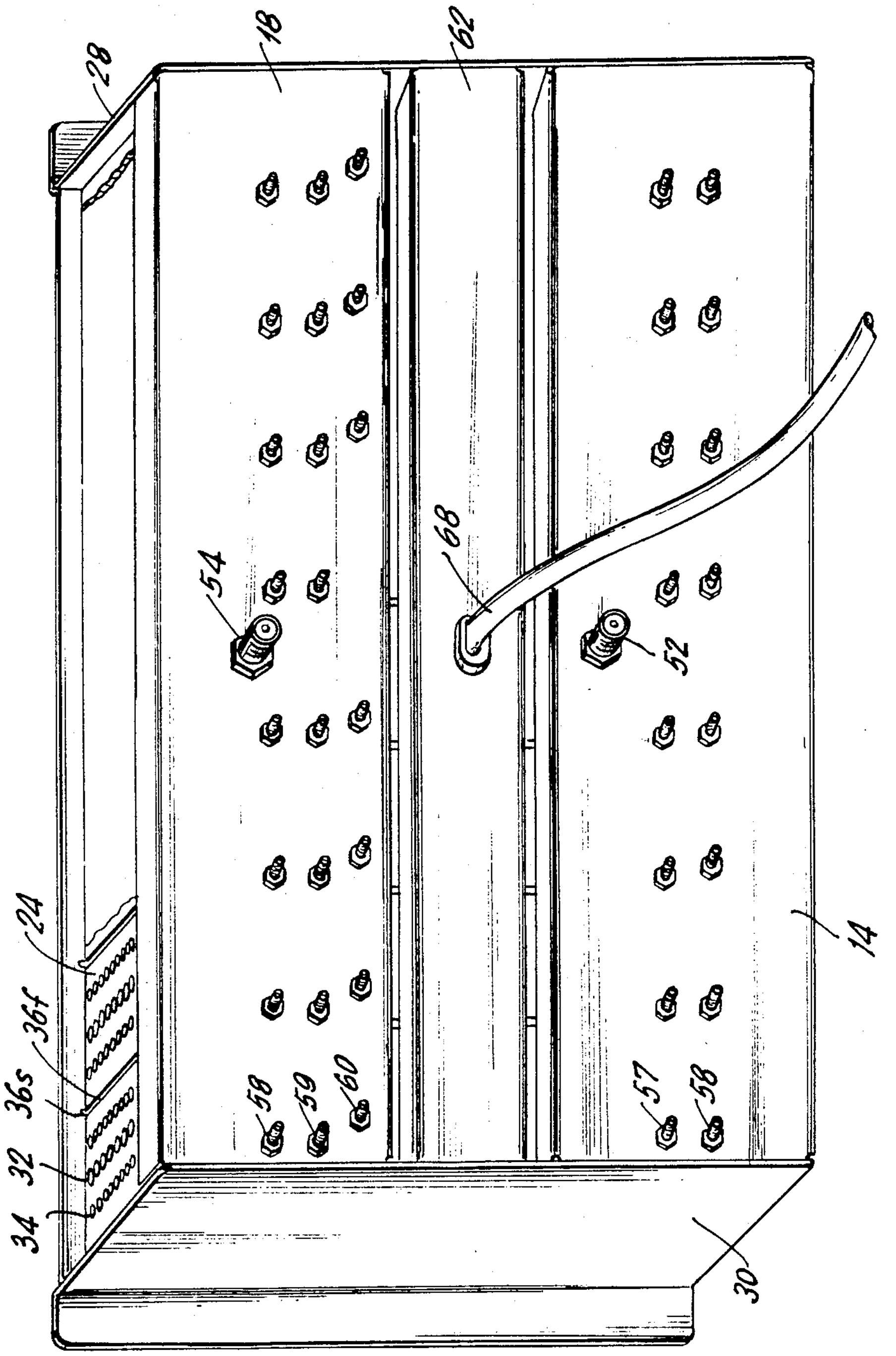
FIG. 4 is an oblique rear view of the enclosure seen in FIG. 3.

FIGS. 3 and 4 illustrate one preferred form of hardware arrangement for the signal distribution system of FIG. 1. This arrangement includes a frame or housing 22 in which the modular amplifiers 16 are normally contained. For purposes of illustration, four of the amplifiers are shown removed, three amplifiers (channels 7, 9 and 11) are in their proper slots, and the channel 13 amplifier is shown partially removed.

The housing 22 is made up of a top section 24, a bottom section 26, and two sides 28 and 30. Large and small ventilation holes 32 and 34 are provided in the top and bottom sections 24 and 26. Slots **36*s* are provided in the top section 24 and slots 38*s* are provided in the bottom section 26; these slots are provided to receive the flanges 36*f* and 38*f*** respectively, provided on the modular amplifier units as seen in FIGS. 4 and 5, and also FIGS. 6 and 7.

The combined input filter 14 of FIG. 1 is mounted at the bottom rear of the housing 22 of FIGS. 3 and 4 and the combined output filter 18 is mounted at the top rear of the housing. The front of the input filter 14 is provided with coaxial output receptacles 40–2, 40–4, 40–5, 40–FM, 40–7, 40–9, 40–11, and 40–13 for the channels 2, 4, 5, FM, 7, 9, 11 and 13, those for the latter four channels not being visible in the drawing. Each of these receptacles is engageable by a coaxial mating jack 42 mounted on the lower portion of the modular amplifier unit 16, as seen in FIG. 5, to feed a given channel signal to the respective channel amplifier unit. The amplified channel signal output appears at a jack 44 provided at the top of each amplifier unit 16 and engageable with a respective mating receptacle 46–2, 46–4, 46–5, 46–FM, etc. on the front of the output filter 18. Another series of receptacles 48–2, 48–4, 48–5, etc. (except for the FM channel) is provided for feeding an AGC input back into the amplifier unit when the AGC type of module is used rather than the manual type; for this purpose a mating jack 50, seen in dashed lines in FIG. 5, is provided on the rear of the amplifier module.

The rear of the input filter 14 is provided with a coaxial input receptacle 52 for receiving a cable connection from the antenna, such as that indicated by the numeral 10 in FIG. 1. The coaxial output receptacle 54 on the back of the output filter provides the output signals of the system. Adjusting screws 56–57 are provided on the back of the input filter 14 to provide suitable channel adjustments for each frequency selective network therein. Similar adjustment screws 58–60 are also provided for this purpose on the back of the output filter 18.

The housing 22 also includes a power access panel 62 having a plurality of AC receptacles 64 on the front thereof. These receptacles 64 are engaged by suitable mating plugs on the amplifier units, such as the plug 66 seen in FIG. 5. The power is provided by an AC line 68 at the back of the panel 62.

Figure 6:
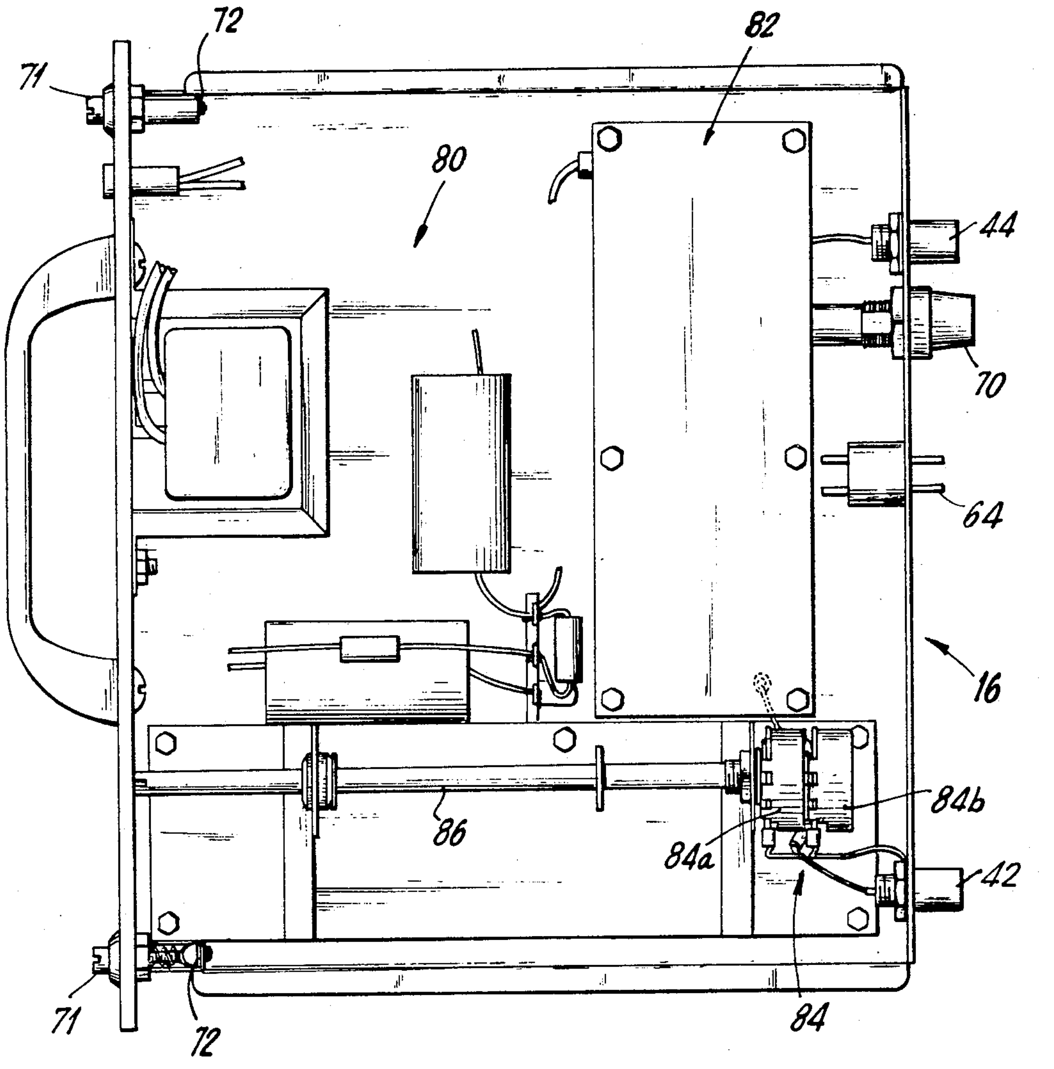
FIG. 6 is a side view of the modular amplifier with the cover removed to show the general layout of parts therein.
Figure 7:
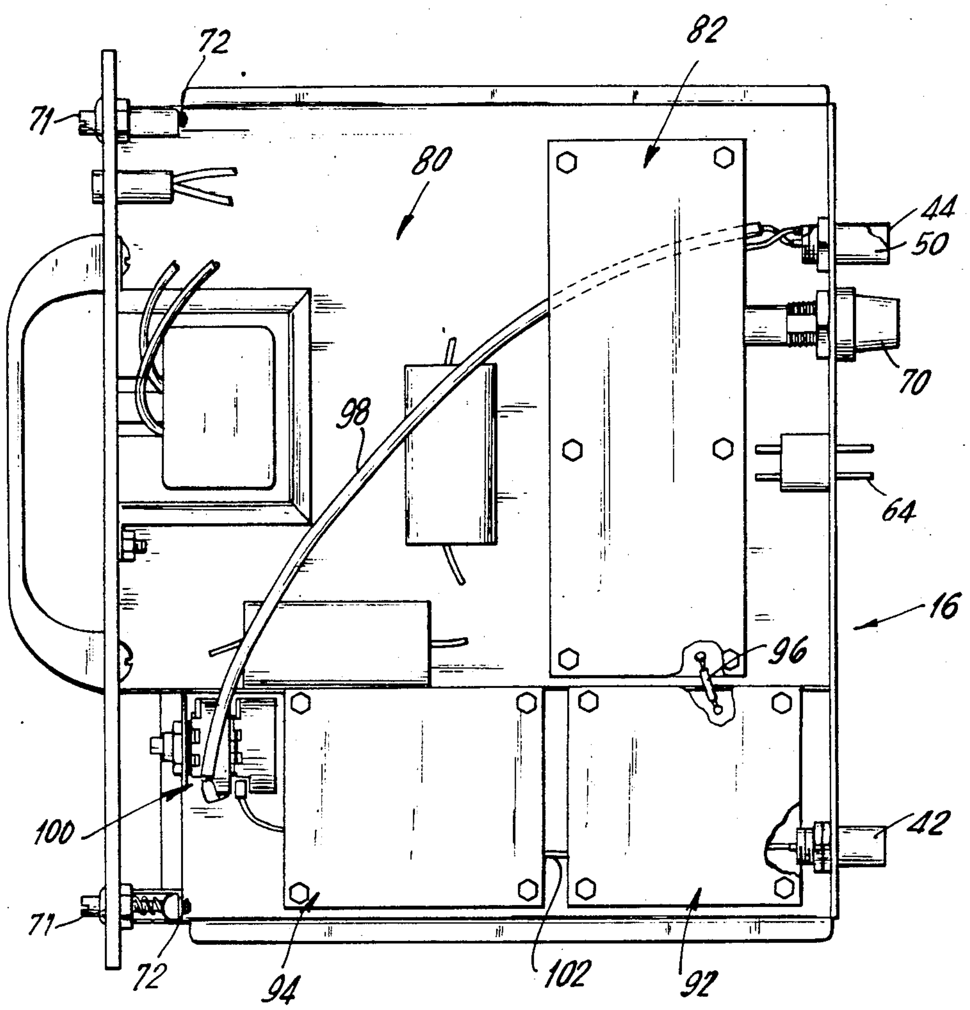
FIG. 7 is a side view of another type of modular amplifier with the cover removed to show the general layout of parts therein.

Still referring to FIGS. 4 and 5, and also now to FIGS. 6 and 7, a fuse arrangement 70 is provided at the back of each amplifier module 16 and is in series with the power line therein. Each amplifier unit 16 is further provided with a locking mechanism 72 at both the top and bottom of the amplifier front panel. By turning the screw 71 which protrudes from the amplifier front panel, an engaging member 72 behind the panel is rotated into the front-most hole of the hole series 32 at both the top and bottom of housing 22 to prevent the module 16 from becoming accidentally disengaged. A handle 74 is also provided on the amplifier front panel and is preferably of a material such as aluminum to serve as a heat sink to aid in cooling the amplifier. Cooling is also provided by holes 76 in the top and bottom of the module, which cooperate with the holes 32 and 34 in the housing 22 to provide suitable ventilation. A pilot light 78 is provided above the handle 74 on each module 16 to indicate the presence of power in the unit.

FIG. 6 shows the general arrangement of parts within the manual type of amplifier module (that is, an amplifier without AGC) and FIG. 7 shows the arrangement for the AGC type. The manual amplifier module of FIG. 6 comprises essentially a power supply section indicated generally by the arrow 80, and a broadband amplifier section indicated generally by the arrow 82. This manual amplifier is so-called because it is provided with means for adjusting the amplifier gain manually. This means includes a variable bridged T attenuator 84 connected between the amplifier input jack 42 and the input to the amplifier section 82. This attenuator 84 comprises a pair of interconnected potentiometers **84*a* and 84*b*, with a shaft 86 leading to an aperture 88 in the front panel of the module 16. This shaft 86 has a slot 90** so that the gain may be adjusted with a screwdriver through the module front panel.

The AGC amplifier of FIG. 7 also includes the power supply section 80 and broadband amplifier section 82 used in the manual amplifier of FIG. 6. Additionally, however, there is also provided an AGC circuit comprising an AGC variable gain section 92 and a feedback broadband amplifier section 94. The variable gain section 92 is connected between the channel signal input jack 42 and the input 96 to the amplifier section 82. The broadband amplifier section 94 is connected to the AGC input jack 50 through a lead 98 and a bridged T attenuator 100. The output of the amplifier section 94 controls the amplification of the AGC variable gain section 92 by means of a connection 102 thereto. The AGC input signal on the jack 50 is derived from a signal pickoff circuit that is provided with each frequency selecting network in the output filter 18 (except the FM channel), as will appear from the description of FIG. 9. This AGC input signal varies in accordance with variations in the stations' sync pulse tips so that the gain of the main amplifier 82 is also varied therewith to maintain the overall gain substantially constant.

Figure 8:
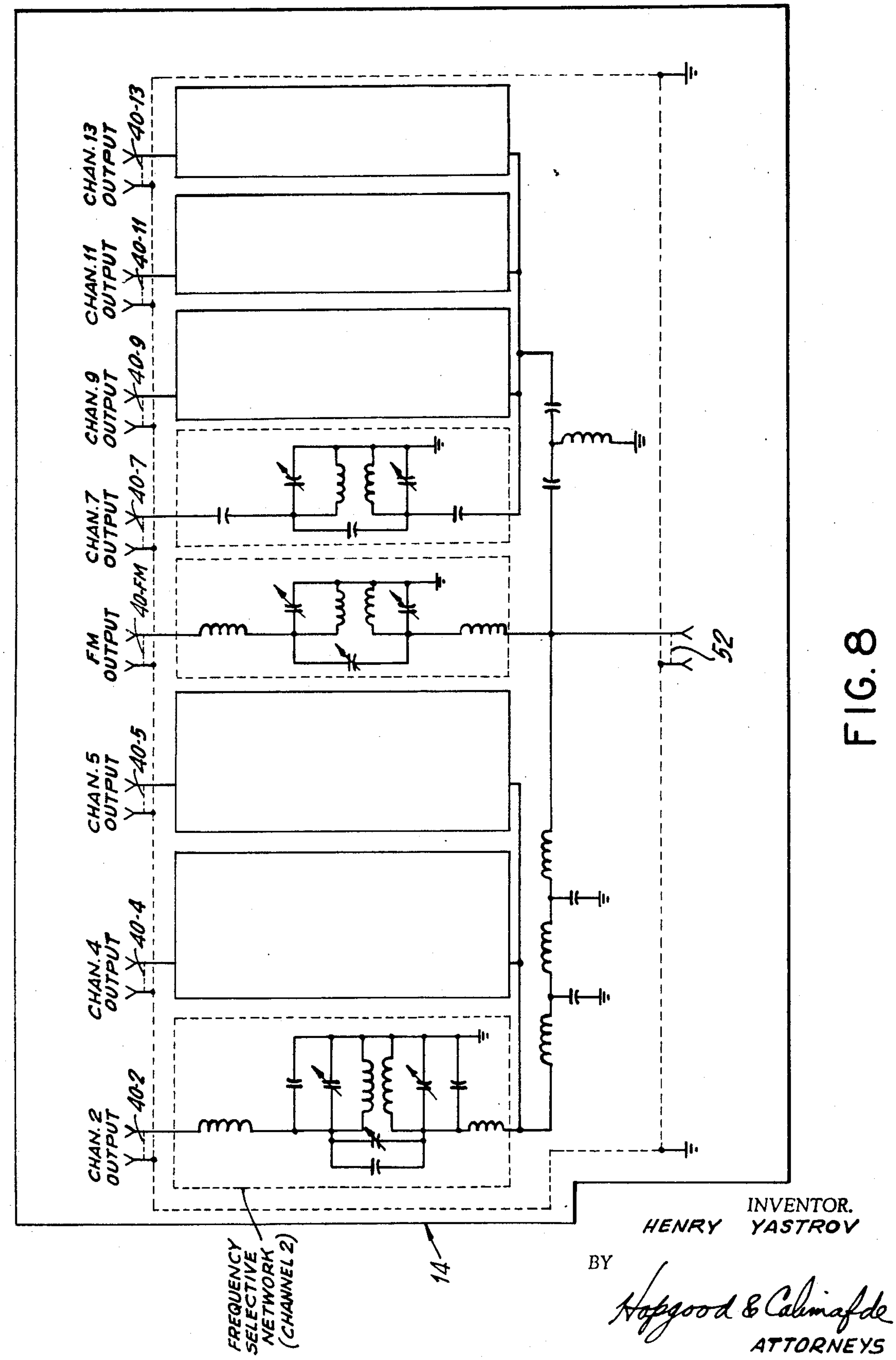
FIG. 8 is a schematic wiring diagram of the input filter which forms a part of the system.

FIG. 8 shows a portion of the schematic wiring diagram for the input filter 14. This figure also shows the coaxial input receptacle connections 52 and the output receptacle connections 40–2, 40–4, 40–5, etc. The L-C frequency selective network for channel 2 is shown as representative of those used for the channels 2, 4, and 5. Similarly the network for channel 7 is shown as representative of those used for channels 7, 9, 11 and 13. The FM frequency selective network is also shown.

Figure 9:
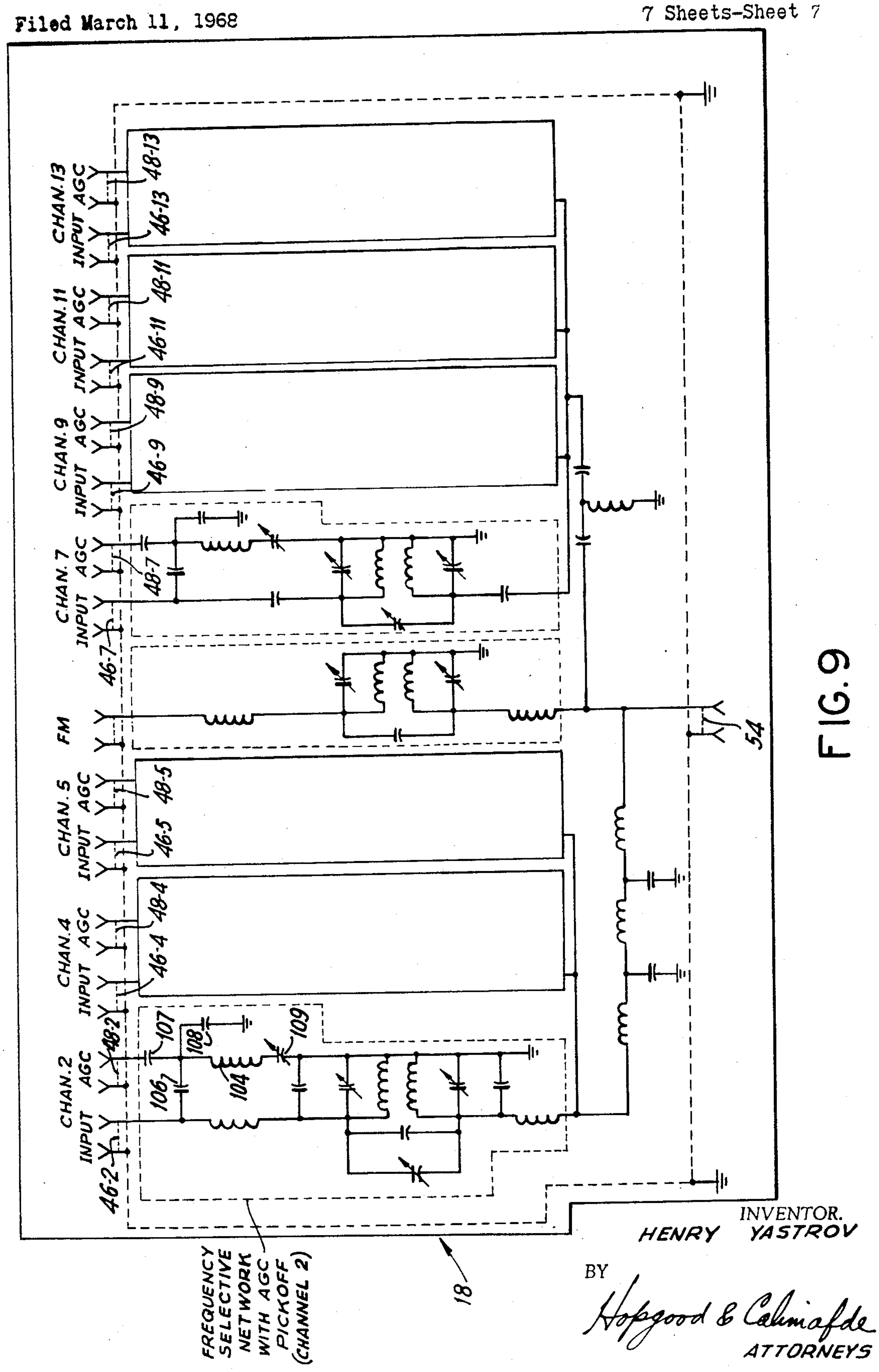
FIG. 9 is a schematic wiring diagram of the output filter which also forms a part of the system.

FIG. 9 shows a portion of the schematic wiring diagram for the output filter 18. The coaxial receptacles described in FIG. 3, i.e., the series 46–2, 46–4, 46–5 . . . represent the inputs from the amplifier modules 16 to the output filter 18. The receptacle 54 carries the output of each signal channel. As in the case of FIG. 8 above, the L-C frequency selective network for channel 2 is shown as representative of the lower end of the VHF band and channel 7 is shown as representative of the upper end of the band. The FM network is also shown, it being noted that no AGC receptacle is employed therefor.

The AGC input signal pickoff circuit referred to in the description of FIG. 7 above includes the inductor 104 and capacitors 106–109, in the case of channel 2. The output of this signal pickoff circuit is available on the receptacle 48–2, and as already noted is fed through the jack 50 to the AGC circuit in the AGC amplifier. Similar signal pickoff circuits are provided with each frequency selective network except for the FM channel so that each television channel position in the housing 22 may employ an AGC amplifier if desired. In accordance with the invention, since the AGC pickoff circuits in FIG. 9 employ inductance and capacitance, these circuits are frequency-sensitive and are therefore included in the output filter 18 rather than in the amplifiers in order that each amplifier unit will be interchangeable with a single spare unit kept in reserve for use when needed.

It will now be appreciated that this invention provides a signal distribution system having significant advantages not found with systems available in the prior art. Specifically, the flange-slot feature provides quick removal and replacement of the amplifier module in the event of failure. This feature also provides automatic and precise engagement of the jacks and contacts on the amplifier module 16 with the various mating receptacles secured to the housing unit 22. Furthermore, by arranging all of the frequency selective networks and the AGC pickoff circuits in the housing 22 rather than in the modules 16, these modules can all be made exactly alike (i.e., either all the manual type or all the AGC type), and therefore completely interchangeable with a single spare unit. The manual and AGC types can also be interchanged, suitable adjustments being made in the bridged T attenuators. The interchangeability feature reduces the maintenance problem for a defective amplifier from a service call to a "quick change" operation merely by substituting the spare amplifier unit on hand. This, in turn, results in the great advantage of immediate restoration of service to the many users served by the system. Still other advantages will be apparent from the foregoing discussion.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A multi-channel signal distribution apparatus comprising a housing having a plurality of guide means, a plurality of input filter means fixedly mounted on said housing for receiving input signals and including discrete frequency selective networks for respectively passing a signal channel of a predetermined bandwidth, a plurality of modular amplifier units each of said units having an input respectively connected to the output of said input filter means, and an output for amplifying the signals in the different channels, and having means engaging said guide means for removable engagement with said housing, the circuitry of said amplifier units being characterized by the absence of frequency selective means therein, and a plurality of output filter means fixedly mounted on said housing, coupled respectively to the outputs of said amplifier units.

2. The apparatus described in claim 1 which further includes mating connecting means on said input and output filter means and also on said amplifier units, whereby operative connections are quickly and automatically made to said units upon insertion thereof into said housing.

3. The apparatus described in claim 1 wherein said guide means comprise slots in said housing and said engaging means comprise flanges on said units engageable into said slots.

4. The apparatus described in claim 1 wherein each of said amplifier units further includes locking means for preventing accidental disengagement thereof from its fully engaged position in said housing.

5. The apparatus described in claim 1 wherein each of said amplifier units includes level control adjustment means.

6. The apparatus described in claim 1 wherein each of said amplifier units includes its own power supply.

7. The apparatus of claim 6, further comprising a plurality of power terminals mounted on said housing for respective connection with the power supplies in said amplifier units.

8. The apparatus described in claim 1 wherein said output filter means also includes discrete frequency selective networks, each for passing the frequencies of the signal channel with which it is associated.

9. The apparatus described in claim 8 wherein external means are provided on said input and output filter means for adjusting said frequency selective networks to one of two adjacent television channels.

10. The apparatus described in claim 8 wherein said output filter means further includes AGC signal pickoff circuits connected to the respective frequency selective networks for developing AGC input signals to be applied to said amplifier units.

11. The apparatus described in claim 10 wherein said pickoff circuits include frequency-sensitive elements.

12. The apparatus of claim 1, in which said housing comprises side walls and an end wall defining an opening for receiving said amplifier units, said guide means being formed in one of said side walls, said input and output filters being fixedly mounted on said end wall.

13. The apparatus of claim 12, further comprising a power supply contained in each of said amplifier units, and a plurality of power terminals mounted in said end wall for respective coupling to said unit power supplies when said amplifier units are engaged in said housing.

References Cited

UNITED STATES PATENTS

| | | | |
|---|---|---|---|
| 2,801,295 | 7/1957 | Sabaroff | 179—171 |
| 2,854,506 | 9/1958 | Pickles | 178—6 |
| 3,176,230 | 3/1965 | Collins | 325—308 |

ROBERT L. GRIFFIN, Primary Examiner

K. W. WEINSTEIN, Assistant Examiner

U.S. Cl. X.R.

325—308, 367, 368